United States Patent [19]

Miskiewicz

[11] Patent Number: 5,664,597
[45] Date of Patent: Sep. 9, 1997

[54] COVER FOR ENCLOSING A FIXED ARTICLE, SUCH AS A FIRE HYDRANT, AND A METHOD OF USING THE SAME

[76] Inventor: William A. Miskiewicz, 215 N. Harrison, St. Berrien Springs, Mich. 49103

[21] Appl. No.: 230,169

[22] Filed: Apr. 20, 1994

Related U.S. Application Data

[63] Continuation-in-part of Ser. No. 189,804, Feb. 1, 1994.

[51] Int. Cl.⁶ .............................. E03B 9/06; F16K 27/12
[52] U.S. Cl. .................. 137/15; 137/296; 137/315; 137/382; 220/8; 220/23.6; 220/324; 220/380
[58] Field of Search ...................... 137/296, 364, 137/369, 370, 371, 377, 381, 382; 220/8, 23.4, 23.6, 315, 324, 380

[56] References Cited

U.S. PATENT DOCUMENTS

| | | | |
|---|---|---|---|
| 565,013 | 8/1896 | Moodie | 137/296 |
| 613,652 | 11/1898 | Chadbourne | 137/371 |
| 906,886 | 12/1908 | Jacob | 137/371 |
| 926,027 | 6/1909 | Smith | 137/296 |
| 1,105,040 | 7/1914 | Paulus | 137/297 |
| 1,353,236 | 9/1920 | Hatfield | 220/DIG. 21 |
| 1,370,207 | 3/1921 | Haase | 220/8 |
| 1,414,219 | 4/1922 | Simensen | 220/8 |
| 2,186,431 | 1/1940 | Riley | 220/8 |
| 2,424,269 | 7/1947 | Doody | 137/272 |
| 2,467,908 | 4/1949 | Rand | 137/272 |
| 2,686,530 | 8/1954 | Dire | 137/382 |
| 2,932,313 | 4/1960 | Noland | 137/339 |
| 3,746,034 | 7/1973 | Cosson | 137/364 |
| 3,756,450 | 9/1973 | Crose, Jr. | 137/382 |
| 3,973,356 | 8/1976 | Schacht | 220/8 |
| 3,980,099 | 9/1976 | Youngblood | 137/382 |
| 4,014,315 | 3/1977 | Lagunilla | 220/8 |
| 4,182,361 | 1/1980 | Oakey | 137/296 |
| 4,244,394 | 1/1981 | Hartselle, III | 137/375 |
| 4,456,027 | 6/1984 | Belgard | 137/382 |
| 4,556,080 | 12/1985 | Picand | 137/296 |
| 4,577,655 | 3/1986 | Carroll | 137/382 |
| 4,736,765 | 4/1988 | Campbell | 137/296 |
| 4,798,239 | 1/1989 | Persohn et al. | 165/45 |
| 4,827,969 | 5/1989 | Lyasko | 137/296 |
| 4,874,105 | 10/1989 | Tetreault | 220/8 |

*Primary Examiner*—George L. Walton
*Attorney, Agent, or Firm*—Hill, Steadman & Simpson

[57] ABSTRACT

A cover is provided for placing over an article fixed to a surface. The cover is particularly useful for covering a fire hydrant and identifying the fire hydrant in the winter months in a climate accustomed to great depths of snow which normally would cover or otherwise conceal the fire hydrant. The cover has an open end and a closed end with an interior volume formed therebetween for enclosing the fire hydrant. The cover includes a strap or the like for securing the cover to the article being covered to prevent the cover from being removed from covering the article.

20 Claims, 4 Drawing Sheets

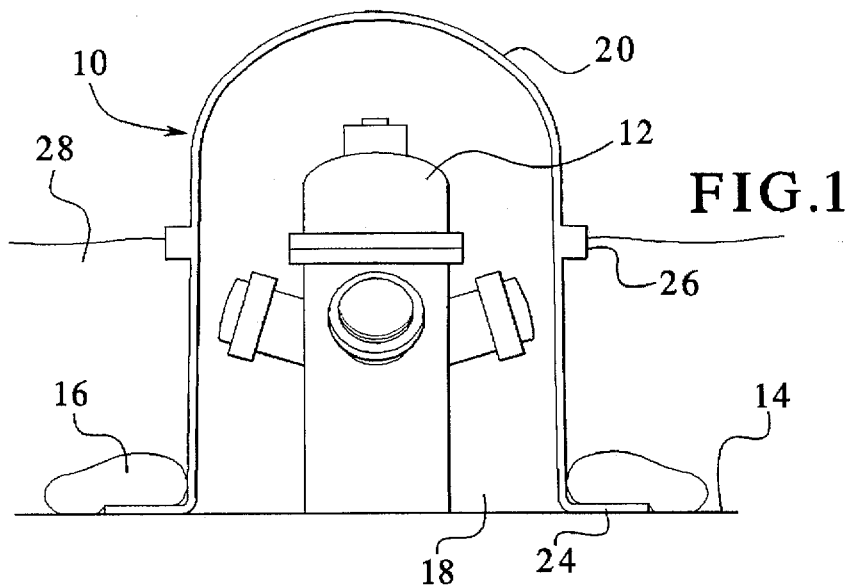
FIG.1
FIG.2
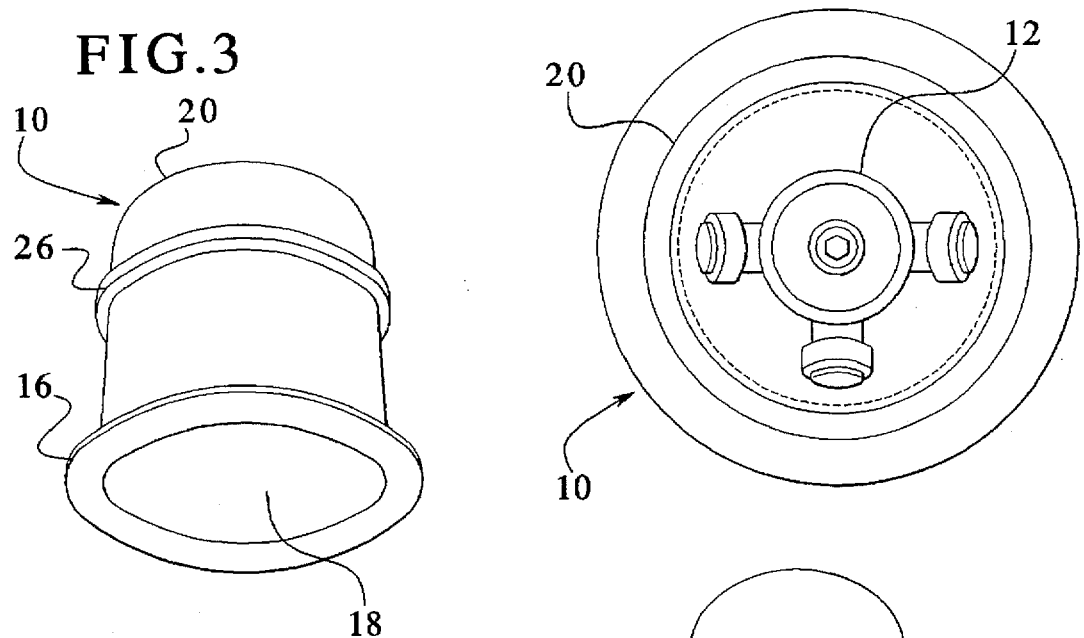
FIG.3
FIG.4
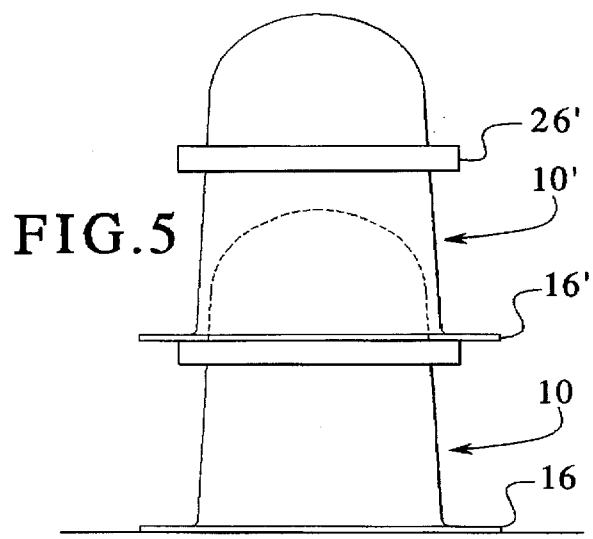
FIG.5

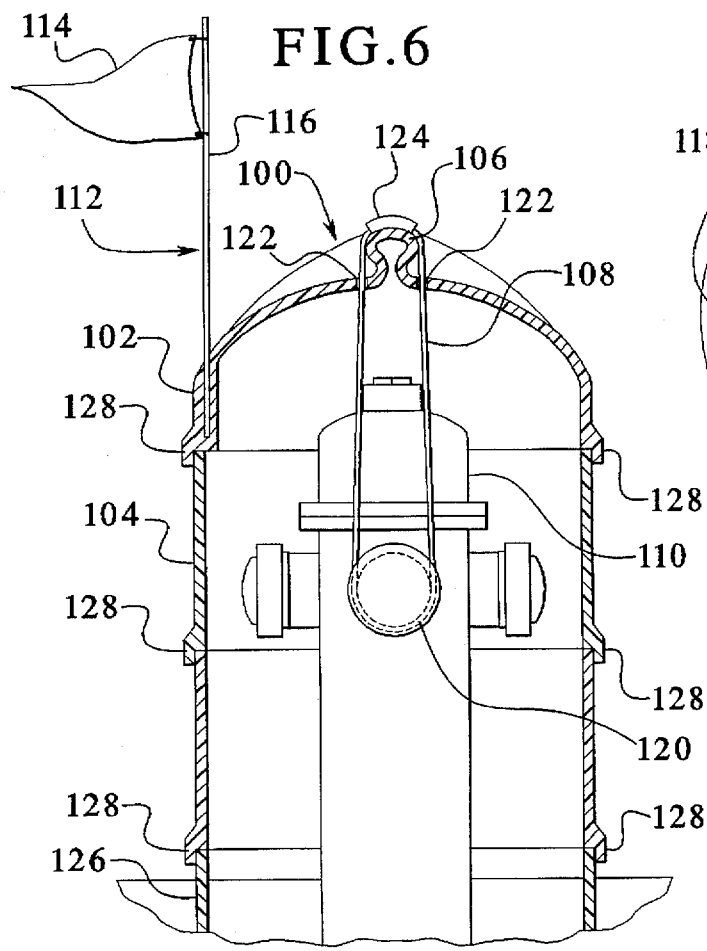
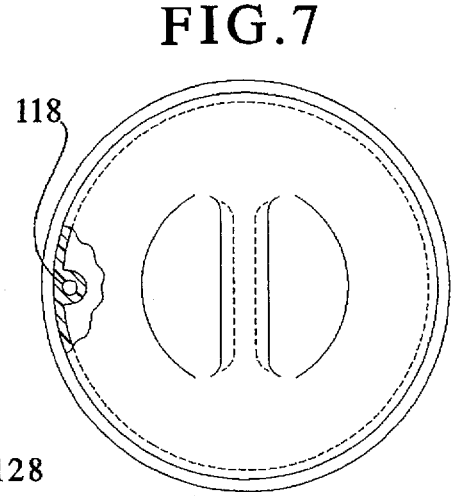
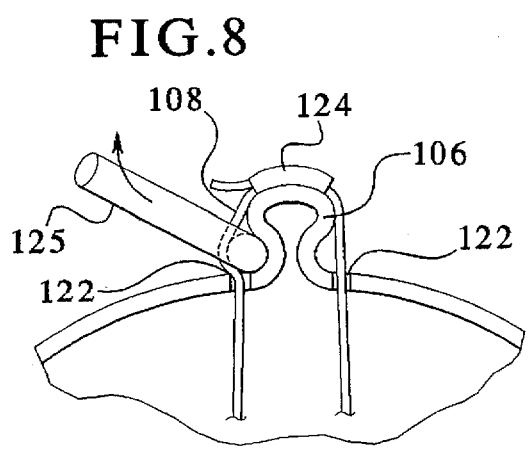
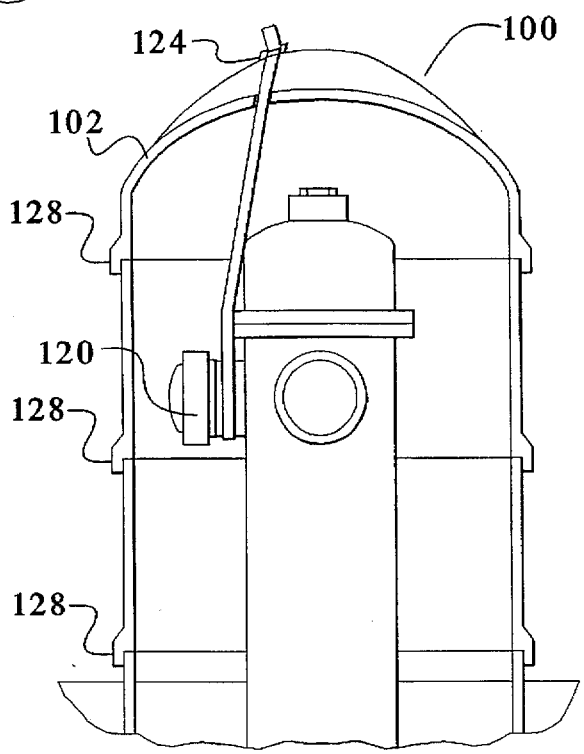

COVER FOR ENCLOSING A FIXED ARTICLE, SUCH AS A FIRE HYDRANT, AND A METHOD OF USING THE SAME

This application is a continuation-in-part of copending U.S. patent application Ser. No. 08/189,804 filed Feb. 1, 1994.

BACKGROUND OF THE INVENTION

The present invention relates generally to a cover for enclosing an article. More specifically, the present invention relates to a cover for enclosing a fire hydrant to protect the hydrant from being concealed in snow, especially during the winter.

Fire hydrants are, of course, known for connecting to a hose for providing a source of water for combating fires by a firefighter or the like. Fire hydrants are typically placed intermittently throughout municipalities. Fire hydrants in cities, for example, are generally placed adjacent to or near sidewalks or lawns, near buildings, houses or the like, such as along city streets. Parking or other obstruction at or around fire hydrants is generally prohibited such that the fire hydrant may be easily accessed in case of an emergency by emergency vehicles, such as fire trucks.

During winter months, especially in climates accustomed to receiving large amounts of snow, fire hydrants can be easily covered and concealed in snow. While the locations of fire hydrants are typically generally known, pinpointing a fire hydrant under a bank of snow can be difficult, if not impossible. Furthermore, when snow collects on fire hydrants, the valve unit to the fire hydrant often freezes making the fire hydrant inoperable. Further, fire hydrants are often tampered with or otherwise vandalized impairing the operation of the fire hydrant.

To identify locations of fire hydrants during the winter months, flags are often attached to the hydrant itself extending into the air thereby enhancing its visibility. In the alternative, snow removal crews are often assembled for the specific purpose of digging out snow around fire hydrants.

A need, therefore, exists for a cover for a fire hydrant or other fixed article to protect the article and to clearly identify the location of the fire hydrant or other article as the same becomes concealed.

SUMMARY OF THE INVENTION

The present invention provides a cover for placing over a fixed article to protect the article and to identify the location of the article as the article becomes concealed. Further, the present invention provides a method for identifying a fixed article and protecting the fixed article.

To this end, in an embodiment, the present invention provides a cover for securing over a fire hydrant. The cover comprises a domed, conical shell forming an interior volume, the interior volume sufficient for enclosing the fire hydrant when placed over the fire hydrant. Further, a strap is provided extending into the shell, the strap securable about a portion of the fire hydrant to maintain the shell over the fire hydrant.

In an embodiment, the cover further comprises a handle constructed and arranged exterior to the shell for maneuvering at least a portion of the shell. The handle may be integrally formed with the shell.

In an embodiment, the shell is formed from at least two separate pieces.

In an embodiment, the cover is separately constructed as an assembly having at least a lid and a sidewall. The sidewall may be collapsible.

In an embodiment, the strap of the present invention is adjustable.

In an embodiment, the cover further comprises a flag removably secured to the shell.

In an embodiment, the shell includes at least a portion having a widened diameter for receiving a second shell for stacking of the shells at the portion of the widened diameter.

In an embodiment, the cover further comprises a sidewall securable into a surface on which the shell is attached.

In an embodiment, the sidewall may include a plurality of segments.

In another embodiment of the present invention, a shed is provided for protecting an article fixed to a surface and for readily identifying location of the article. The shed comprises a cover made of a rigid material having a wall defining an interior, a first end of the cover being open and a second end of the cover forming a dome for enclosing the cover when fixed over the article. A strap extends from the second end securable about a portion of the article fixed in the cover over the article.

In an embodiment, the shed further comprises an identifier attached to the cover to remotely identify location and a requirement of the article under the cover.

In another embodiment of the present invention, a method is provided for securing a cover over a fire hydrant to protect the fire hydrant and to identify location of the fire hydrant. The method comprises the steps of: providing a first shell made of a rigid, breakable material, the first shell having a wall, an open end and a closed end defining an interior; providing a strap secured at an exterior portion of the first shell and connectable to a portion of the fire hydrant; covering the fire hydrant with the first shell by placing the open end over the hydrant; and connecting the strap to the portion of the fire hydrant to secure the first shell to the fire hydrant.

In an embodiment, the method further comprises the steps of: providing a second shell substantially identical to the first shell; placing the second shell over the first shell in a nesting arrangement to increase the height over the fire hydrant; providing a second strap; and securing the second strap to secure the second shell to the first shell.

It is, therefore, an advantage of the present invention to provide a system and a method for protecting an article.

Another advantage of the present invention is to provide a system and a method for identifying an article.

A still further advantage of the present invention is to provide a system and a method for protecting and readily identifying a fire hydrant as the fire hydrant becomes concealed with, for example, snow.

Still further, an advantage of the present invention is to provide a system and a method for preventing operational failure of the fire hydrant by protecting the fire hydrant from its immediate environment.

Moreover, an advantage of the present invention is to provide a system and a method for increasing visibility of a fire hydrant as the fire hydrant becomes concealed with snow.

And, another advantage of the present invention is to provide a system and a method for increased height of a cover as the fixed article becomes more and more concealed.

Yet another advantage of the present invention is to provide a system and a method for securing a cover over an article, such as a fire hydrant, to prevent removal of the cover therefrom.

These and other advantages of the present invention will be described in and will be apparent from the detailed description of the presently preferred embodiments and from the drawings.

BRIEF DESCRIPTION OF THE DRAWINGS

FIG. 1 illustrates an environmental view of a cover of the present invention secured over a fire hydrant.

FIG. 2 illustrates a top plan view of the cover of the present invention over a fire hydrant.

FIG. 3 illustrates a perspective view of the cover of the present invention.

FIG. 4 illustrates a plan view of a ring securing about the cover of the present invention.

FIG. 5 illustrates a plan view of two covers stacked one on top of another.

FIG. 6 illustrates another embodiment of the present invention having a securing strap extending for attachment to an article, such as a fire hydrant.

FIG. 7 illustrates a top view, partially in cross-sectional detail of the embodiment illustrated in FIG. 6.

FIG. 8 illustrates a view of the handle and the strap of the embodiment illustrated in FIG. 6.

FIG. 9 illustrates a side view of the embodiment illustrated in FIG. 6.

DETAILED DESCRIPTION OF THE PRESENTLY PREFERRED EMBODIMENTS

Figure 10:
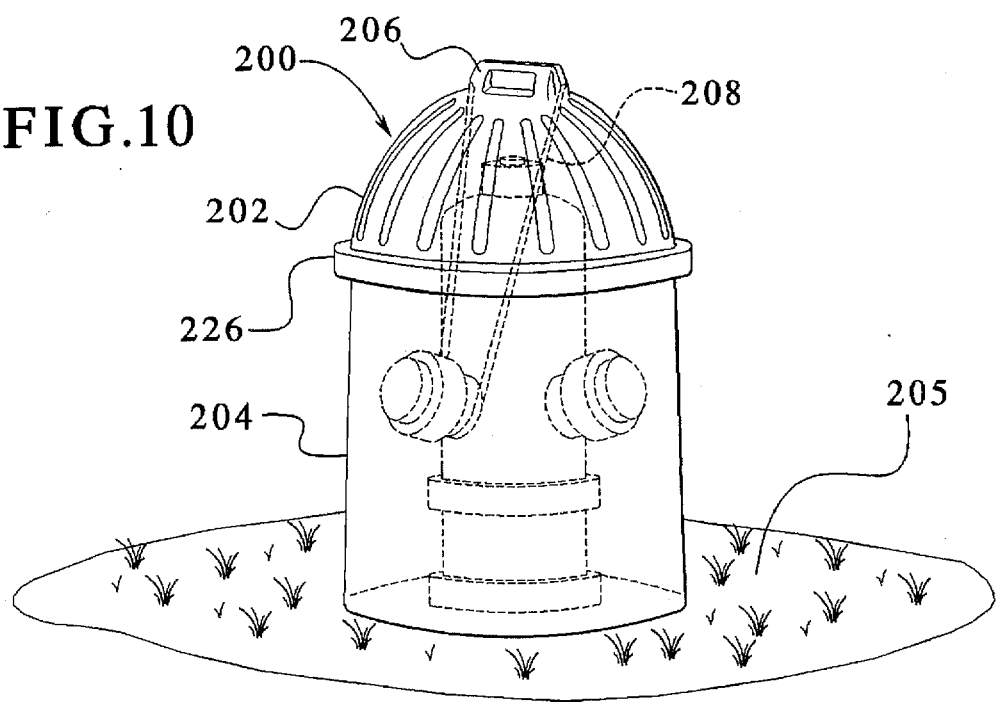
FIG. 10 illustrates a perspective of another embodiment of the strap and handle of the hydrant cover of the present invention as secured over a hydrant.

The present invention provides an apparatus and a method for covering, protecting, and readily identifying an article fixed to a surface. More specifically, a cover or shed is provided for covering a fire hydrant and protecting the same. The cover readily identifies the fire hydrant as the hydrant would normally become covered in, for example, snow.

Referring now to FIG. 1, a cover or shed 10 is generally shown placed over an article, such as a fire hydrant 12. The fire hydrant 12 is permanently secured to a surface 14, for example, the ground, a sidewalk, or the like.

The cover 10 includes an edge or lip 16 at its base which stabilizes the cover 10 on the surface 14 when placed over the fire hydrant 12. The lip 16 or edge may extend about the entirety of the base of the cover 10, or, alternatively, tabs or other segmented surfaces to stabilize the cover 10 on the surface 14 may be provided.

The cover 10 at its base has an open end 18 such that the cover may be placed over the fire hydrant 12. The closed end 20 as illustrated is slightly rounded or domed. This prevents material, such as snow, from collecting and concealing the cover 10. The wall 22 is slightly tapered, gradually increasing from the closed end 20 to the open end 18.

While a conical-type cover is illustrated in the figure, of course, other shapes and configurations are contemplated for the present invention. For example, a pyramid-type shape may be implemented with a pointed end and tapering sidewall to a wider base and having an edge or lip or segmented portion to stabilize the cover after placement on a surface.

As further illustrated in FIG. 1, the lip 16 of the cover 10 may be initially secured to the surface 14 using, for example, sandbags 24. Of course, other methods for removable securing the cover 10 to the surface 14 are contemplated, such as driving spikes or nails through the lip 16 into the surface 14. The cover 10 may also be permanently secured to the ground surface 14. Using this permanent-type embodiment, maintenance crews and the like can easily identify whether the hydrant 12 itself has been tampered with by recognition of tampering of the cover 10.

In another embodiment of the invention a water-weighted ring may be used. In this embodiment, a ring may be slid over the cover 10 and slid to the lip 16 at the base of the cover 10. The ring can then be weighted with water. The amount of water can be adjusted to take into consideration allowances for evaporation and freezing. The ring can be easily drained of the contained water by suitable means well known to those skilled in the art.

In another alternative embodiment, a two-piece shell can be implemented where the first-half is placed over the hydrant and secured in place in any of the manners previously described or any other manner. For example, a cable tie may be strapped directly to or around the hydrant from the interior of the first-half of the two-piece shell after placing the first-half of the shell over the hydrant or other fixed article. Then, the second piece can be removably secured to the first piece, such as by threadably attaching mating surfaces, snapping together adjacent surfaces or the like.

The cover 10, in a preferred embodiment, is a rigid plastic material capable of easily shattering by, for example, an axe of a firefighter when access to the hydrant 12 is desired. The cover 10 must be rigid enough to protect the fire hydrant 12 and yet formed of a material to provide ready access to the fire hydrant 12 when necessary. A preferred material for the cover 10 is plastic which has been treated or formed for fracturing of the cover of course, other materials providing similar functions and results may, of course, be implemented.

As further illustrated in FIG. 1, secured about the exterior of the wall 22 is a ring 26. The ring 26 increases the cross-sectional area (or diameter in the case of a conical cover as illustrated in FIG. 1) of the exterior wall at a point intermediate the open end 18 and the closed end 20. The ring 26 may be integrally formed with the cover 10. In the alternative, the ring is separately formed and only secured about the cover 10 as required. The ring 26 enables the stacking of the covers 10 to increase overall height of the covers over the fire hydrant 12 as depth of snow 28 (shown in FIG. 1) increases.

Therefore, when the depth of the snow threatens to conceal the first cover 10, the ring 26 may be added and secured about the cover 10 such that the lip 16' of a second cover 10' (see FIG. 5) may rest against the ring 26 of the first cover 10. In this manner, covers may be continually added to increase the height of these covers over the hydrant 12. The location of the hydrant 12 may then be easily identified regardless of the amount of snow which falls in a given season that would normally completely cover and conceal the hydrant 12 from view. To access the hydrant 12 with multiple covers thereon, the top covers may be removed or otherwise broken as before, with, for example, the axe thrown by the firefighter.

The cover 10 may be made of an insulative-type material as well, such as a styrofoam-based or polystyrene-type material. The insulating material provides further wind and cold resistance for the fire hydrant 12 preventing the valves of the fire hydrant 12 from freezing or otherwise malfunctioning. Still further, the covers 10 and/or the ring 26 may be constructed of a material having a color which is readily identifiable and distinguishable from, for example, the snow. The cover 10, however, must be a material which is collapsible or can be fragmented when struck by a firefighter with a fire hydrant wrench, axe, shovel, or the like.

In an embodiment, the covers are constructed for easy stacking of the covers for out-of-season storage if the covers are not for year-round use. The covers may also be made for decorative type purposes depending on the locations on which the cover is to be used.

Of course, other fixed articles are contemplated for covering which require access or identification throughout the winter season when the same may typically become covered with snow or the like or otherwise caused to malfunction due to cold, freezing rain, and the like. Therefore, the present invention is not to be construed as limiting to covering of fire hydrants or identification and protection of fire hydrants in the snow.

Referring now to FIG. 6, another embodiment of a cover 100 is generally shown. The cover 100 includes at least two separate portions including a domed lid 102 and a sidewall 104. The domed lid 102 includes a handle 106 through which an adjustable strap 108 may extend for securing the cover 100 over, for example, a fire hydrant 110.

Also included in the embodiment of the cover 100 illustrated in FIG. 6 is an identifier 112, such as a flag 114 secured on a post 116. The post 116 may be removably secured within an aperture 118 of the cover 100 (illustrated in FIG. 7). The flag 114 on the post 116 simplifies identification and location of the hydrant as the same becomes covered with snow or otherwise concealed. The flag 114, the post 116 and/or some other identifier may identify a specific characteristic of the fire hydrant 110 as well. For example, water pressure requirements for the hydrant 110 may be identified by a flag of a particular color.

Referring again to FIG. 6, the strap 108 is secured around a protruding portion 120 of the hydrant 110. The protruding portion 120 selected for connection as illustrated is an arm of the fire hydrant 110 to which a hose may be connected. To this end, the base portion of the cover 100 formed by the sidewalls 104, are secured into the ground or otherwise placed on the surface on which the hydrant 110 is non-removably secured. The strap 108 is threaded through a top portion of the domed lid 102 through apertures 122 (shown in FIGS. 6 and 8) and then the dome lid 102 is placed to securably attach to the sidewalls 104. The strap 108 may then be secured through the fastener 124. The fastener 124, as illustrated, is a buckle-type fastener, but any known fastener may be implemented by those skilled in the art providing adjustability so as to securely mount the cover 100 over the hydrant 110. Further, in an embodiment, a locking fastener may be provided to prevent unauthorized removal of the fastener 124 so as to remove the cover 100.

As illustrated in FIGS. 6 and 9, a ring 126 may be placed into, for example, soil around the hydrant 110, such that the sidewall 104 may securely nest thereon through interengagement therebetween. Exterior to the sidewalls 104 and preferably integral therewith are a plurality of rings 128. The rings 128 are defined and distinct portions of the sidewall 104. With the rings 128, the height of the cover 100 can continually increase by adding additional lengths of the sidewall 104. In the alternative, an additional cover may be stacked over the first cover 100 and the strap of the additional cover may extend to secure to the handle 106 of the first cover 100 or further extend to the hydrant 110 itself. The domed lid 102 of the cover 100 is shaped such that snow does not collect thereon thereby accumulating and covering the cover 100.

As illustrated in FIG. 8, a wrench 125 or other tool may be used to break the strap 108 securely held by the fastener 124. The handle 106 is slightly recessed to provide a clearance for the wrench 125 or other tool to extend between the handle 106 and the strap 108. In this manner, the strap 108 may be broken from or otherwise released from its secure fit around the handle 106 holding the domed lid 102 over the hydrant 110.

Figure 11:
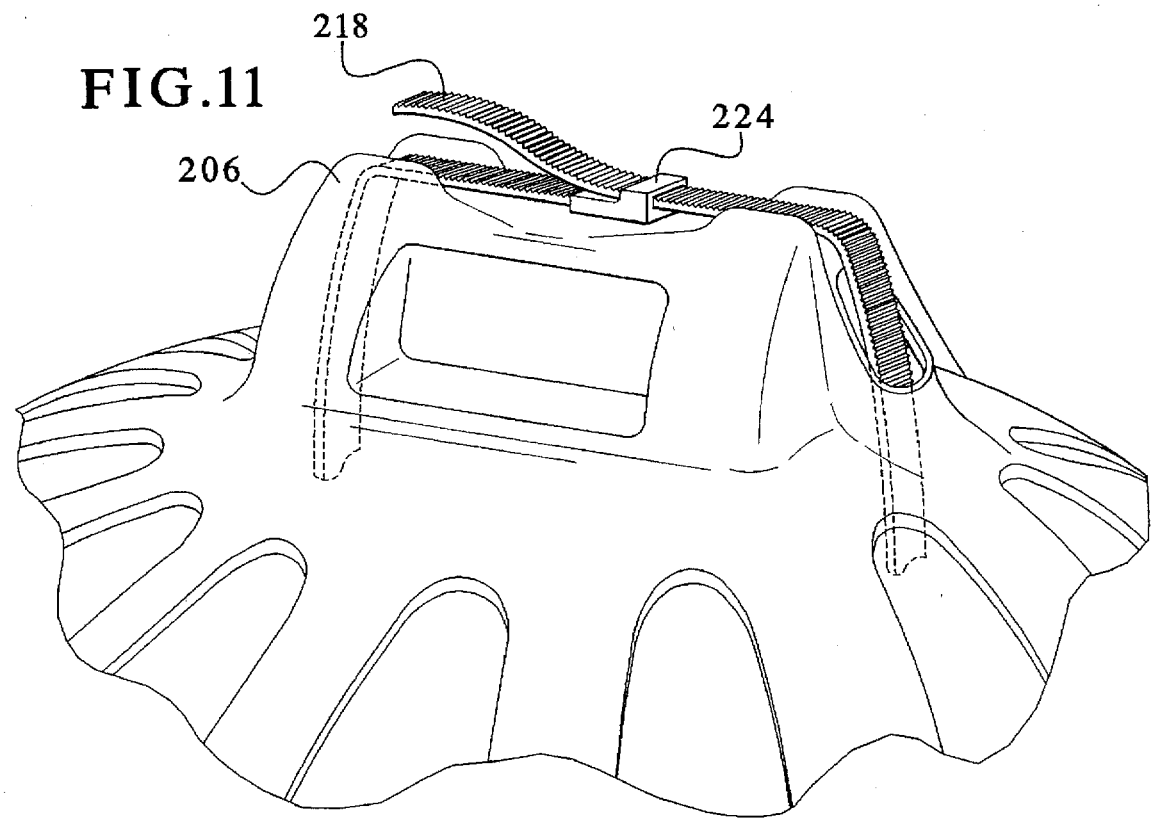
FIG. 11 illustrates a close up perspective view of the handle and strap of the embodiment illustrated in FIG. 10.

Referring now to FIGS. 10 and 11, a similar embodiment to that illustrated in FIG. 6 is shown, except with a handle and a strap oriented somewhat differently for securing of the cover to the hydrant. The cover is generally shown at 200 and includes a domed lid 202 secured to a height of sidewall 204 which is secured into the ground 225. A handle 206 is oriented such that a strap 208 is threaded through a length of the handle 206. The strap 208 may be adjustably secured with the fastener 224, such as a buckle or other known fastening device providing adjustability and/or locking of the fastener 224.

Figure 12:
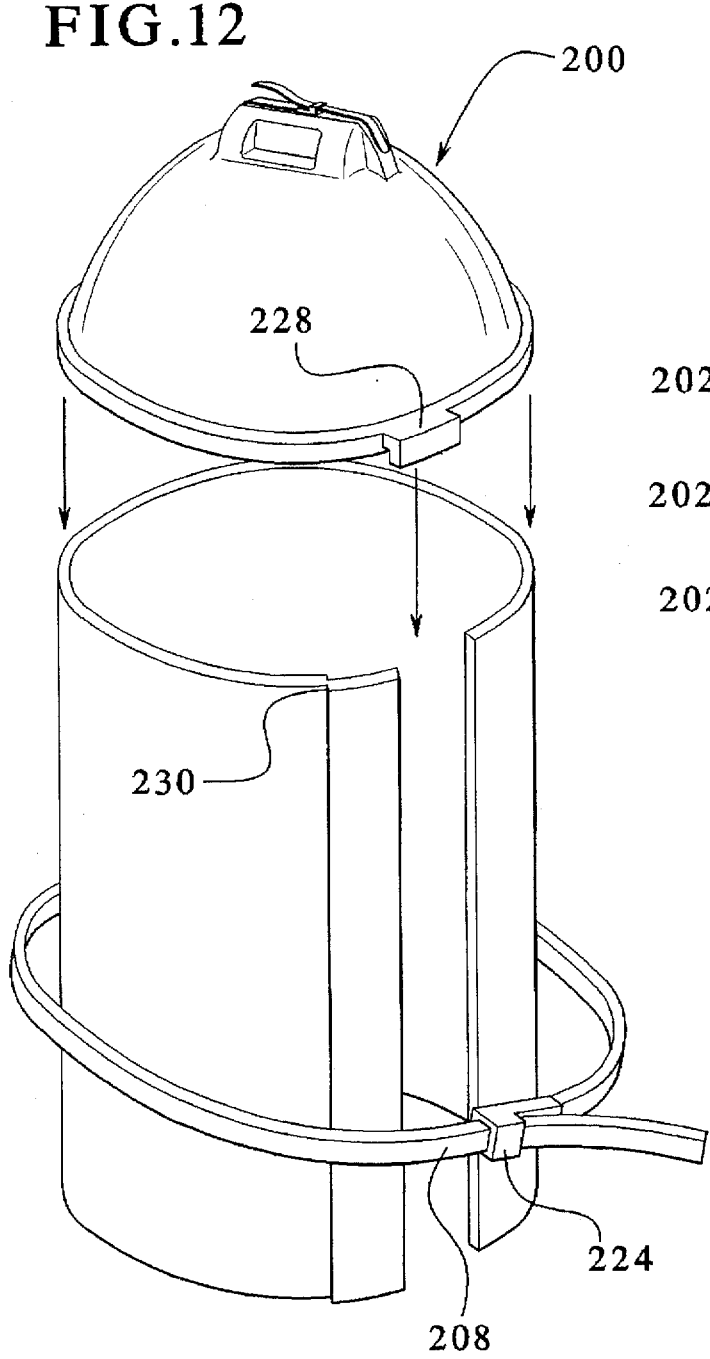
FIG. 12 illustrates the assembly of the embodiment illustrated in FIG. 10.

A ring 226 is provided having a notch 228 as illustrated in FIG. 12 for securing within a corresponding recess 230 of the sidewall 204 for locking interengagement therebetween. The ring 226 allows stackability and/or subsequent addition of other sidewalls 204 to increase the overall height of the cover 200.

Figure 13A:
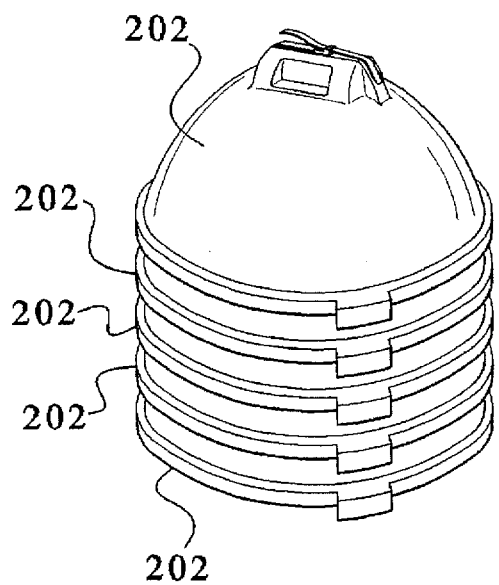
FIGS. 13A and 13B illustrate the stackability of the domed covers and the collapsibility of the sides and subsequent stacking respectively, of the embodiment of the cover illustrated in FIG. 10.
Figure 13B:
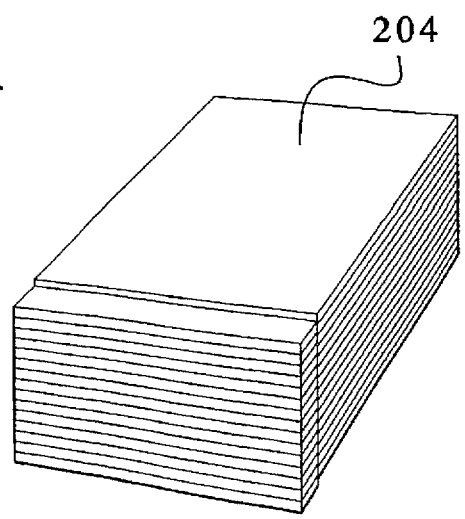

As illustrated in FIG. 13A, the cover 202 or the cover 102 of FIG. 6 are constructed and arranged for convenient stacking for storage of the same during, for example, the summer months. Likewise, the sidewalls 204 of FIG. 10 or the sidewall 104 illustrated in, for example, FIG. 6 is constructed of a rigid material so as to provide a protective cover for the hydrant 110 and yet provide a flexible, collapsible sidewall to store the same by stacking as illustrated in FIG. 13B.

Therefore, it should be understood that various changes and modifications to the presently preferred embodiments described herein will be apparent to those skilled in the art. Such changes and modifications may be made without departing from the spirit and scope of the present invention and without diminishing its attendant advantages. It is, therefore, intended that such changes and modifications be covered by the appended claims.

I claim:

1. A cover for securing over a fire hydrant on a substantially horizontal surface, the cover comprising:

a multi-part domed shell having exterior walls forming an interior volume wherein the exterior walls have apertures through the exterior walls, the interior volume sufficient for enclosing the fire hydrant when placed over the fire hydrant wherein a first part of the shell extends from the horizontal surface such that the shell surrounds the fire hydrant and a second part of the shell mounts on the first part remote from the horizontal surface to completely enclose the fire hydrant wherein the second part is removable from the first part; and a strap extending through the apertures formed in the exterior walls of the shell and into the shell, the strap securable to a portion of the fire hydrant within the shell to maintain the shell over the fire hydrant wherein the strap is releasably secured at the apertures.

2. The cover of claim 1 further comprising:

a handle attached to an exterior of the shell for maneuvering at least a portion of the shell.

3. The cover of claim 2 wherein the handle is integrally formed with the shell.

4. The cover of claim 1 wherein the shell is formed from at least two separate pieces.

5. The cover of claim 1 wherein the shell is separately constructed as an assembly having at least a lid and a sidewall.

6. The cover of claim 5 wherein the sidewall is collapsible.

7. The cover of claim 1 wherein the strap is adjustable.

8. The cover of claim 1 further comprising:

a flag removably secured to the shell.

9. The cover of claim 1 wherein the shell includes at least a portion having a widened diameter for receiving a second shell for stacking of the shells at the portion of the widened diameter.

10. The cover of claim 1 further comprising:

a ring securable into the surface on which the shell is attached.

11. The cover of claim 5 wherein the sidewall includes a plurality of segments.

12. A shed for protecting an article fixed to a substantially horizontal surface and for readily identifying location of the article, the shed comprising:

a multi-part cover made of a rigid material having a wall defining an interior wherein the wall has apertures through the wall, a first part of the cover is open to be received over the article and extends from the horizontal surface and a second part of the cover forms a dome enclosing the article when the second part is mounted on the first part remote from the horizontal surface and is fixed over the article; and a strap extending through the apertures formed in the wall of the cover and securable to a portion of the article within the cover fixing the cover over the article wherein the strap is releasably secured at the apertures.

13. The shed of claim 12 wherein the strap is adjustable.

14. The shed of claim 12 further comprising:

a handle attached to an exterior portion of the cover.

15. The shed of claim 12 wherein the second part forming the dome is separately formed from the wall.

16. The shed of claim 14 wherein the handle is integrally formed with the second part.

17. The shed of claim 12 wherein the wall is formed of a plurality of parts.

18. The shed of claim 12 further comprising:

an identifier attached to the cover to remotely identify location and a requirement of the article under the cover.

19. A method for securing a cover over a fire hydrant on a horizontal surface to protect the fire hydrant and identify location of the fire hydrant, the method comprising the steps of:

providing a first shell made of a rigid breakable material, the first shell having a wall, an open end and a closed end defining an interior wherein the first shell extends from the horizontal surface such that the first shell encloses the fire hydrant;

providing a strap through apertures formed in the wall of the first shell and releasably secured at the apertures in the wall of the first shell and connectable to a portion of the fire hydrant;

covering the fire hydrant with the first shell by placing the open end over the hydrant such that the open end rests on the horizontal surface;

connecting the strap to the portion of the fire hydrant to secure the first shell to the portion of the fire hydrant;

providing a second shell substantially identical to the first shell; and placing the second shell over the first shell in a nesting arrangement to increase the height over the fire hydrant.

20. A method for securing a cover over a fire hydrant to protect the fire hydrant and identify location of the fire hydrant, the method comprising the steps of:

providing a first shell made of a rigid breakable material, the first shell having a wall, an open end and a closed end defining an interior;

providing a strap through the apertures formed in the wall of the first shell and releasably secured at the apertures in the wall of the first shell and connectable to a portion of the fire hydrant;

covering the fire hydrant with the first shell by placing the open end over the hydrant; and connecting the strap to the portion of the fire hydrant to secure the first shell to the portion of the fire hydrant;

providing a second shell substantially identical to the first shell;

placing the second shell over the first shell in a nesting arrangement to increase the height over the fire hydrant;

providing a second strap; and securing the second strap to secure the second shell to the first shell.

* * * * *